United States Patent [19]

Cook

[11] 4,042,661
[45] Aug. 16, 1977

[54] METHOD AND APPARATUS FOR FORMING TUBULAR MULTILAMINATE PLASTIC FILM

[75] Inventor: Stephen Olney Cook, Mill Valley, Calif.

[73] Assignee: Crown Zellerbach Corporation, San Francisco, Calif.

[21] Appl. No.: 651,983

[22] Filed: Jan. 23, 1976

[51] Int. Cl.² .............................................. B29F 3/10
[52] U.S. Cl. ................................... 264/173; 264/209; 425/133.1; 425/376 A; 425/462
[58] Field of Search ................ 264/171, 173, 209, 95, 264/176 R; 425/133.1, 191, 376 A, 462, 131.1

[56] References Cited

U.S. PATENT DOCUMENTS

| 2,501,690 | 3/1950 | Prendergast | 264/173 |
| 3,266,092 | 8/1966 | Corbett | 264/209 |
| 3,546,743 | 12/1970 | Roth | 425/191 |
| 3,558,755 | 1/1971 | Laban et al. | 264/173 |
| 3,694,119 | 9/1972 | Scheibling | 264/171 |
| 3,966,861 | 6/1976 | Papesh et al. | 264/173 |

FOREIGN PATENT DOCUMENTS 2,430,231 1/1975 Germany .............................. 264/173

*Primary Examiner*—Jeffery R. Thurlow
*Attorney, Agent, or Firm*—Stanley M. Teigland; Corwin R. Horton

[57] ABSTRACT

Tubular multilaminate film having four or more layers can be made by a. combining two or more streams of dissimilar resins to form a first stream of parallel layers of the resins and feeding the stream into a first annular space wherein the stream divides into two substreams which flow laterally in opposite directions about the axis of the space and then join to form a first annular stream in which the layers are coaxial, b. combining two or more other streams of resins to form a second stream of parallel resin layers and feeding the stream into a second annular space which is concentric with the first annular space and wherein the second stream divides into two substreams which flow laterally in opposite directions about the axis of the space and then join to form a second annular stream in which the layers are coaxial, and c. combining the first and second annular streams to form a composite annular stream, and d. expressing the composite annular stream through an annular orifice to form the tubular multilaminate film.

1 Claim, 3 Drawing Figures

METHOD AND APPARATUS FOR FORMING TUBULAR MULTILAMINATE PLASTIC FILM

BACKGROUND OF THE INVENTION

Blown multilaminate film is made by extruding a tubular multilaminate film from a die and inflating it with air supplied through the center of the die. U.S. Pat. No. 3,546,743 discloses a die for forming such film in which an annular stream of one resin is combined with an annular stream of another resin to form a composite annular stream which is expressed to form the film. Because a separate annular chamber is required for each resin, it is not practical to use such dies for making films having more than three layers.

West German OLS 2430231 discloses a die which has a single annular chamber but which can be used to make multilaminate film by feeding into the chamber a preformed stream of parallel layers of the resins used in making the film. As the stream enters the chamber, it divides into two substreams which flow in opposite directions through the chamber and then join together. The die has been in commercial use for more than one year, but it has been found that is is not practical to use the die to make film having more than about three layers because of the difficulty in (1) preforming a stream of more than three resin layers, (2) forming a satisfactory weld where the substreams join together in the annular chamber, and (3) matching the viscosities of more than three resins. (The viscosities of the resins must be reasonably close so that they all flow at about the same rate.)

SUMMARY OF THE INVENTION

This invention provides an improved method and apparatus for forming tubular multilaminate plastic film. The apparatus is a die body having two inlet passageways, each of which is adapted to receive a stream of resin. Each inlet passageway is in communication with an annular chamber. The annular chambers are substantially concentric and each communicates with an annular outlet passageway. The outlet passageways converge to form a single common annular passageway. As each resin stream enters the die body and flows through the inlet passageway, it has a generally rectangular cross section. When it enters the annular chamber, it divides into two substreams which flow laterally in opposite directions to form, when they join together, a stream having an annular cross section. The respective annular streams flow from the annular chambers through the outlet passageways and converge where the outlet passageways converge to form a composite stream which flows through the common outlet passageway into a conventional die head from which the composite stream is expressed to form a tubular multilaminate film, which may be inflated with air to form blown film.

DETAILED DESCRIPTION

Figure 1:
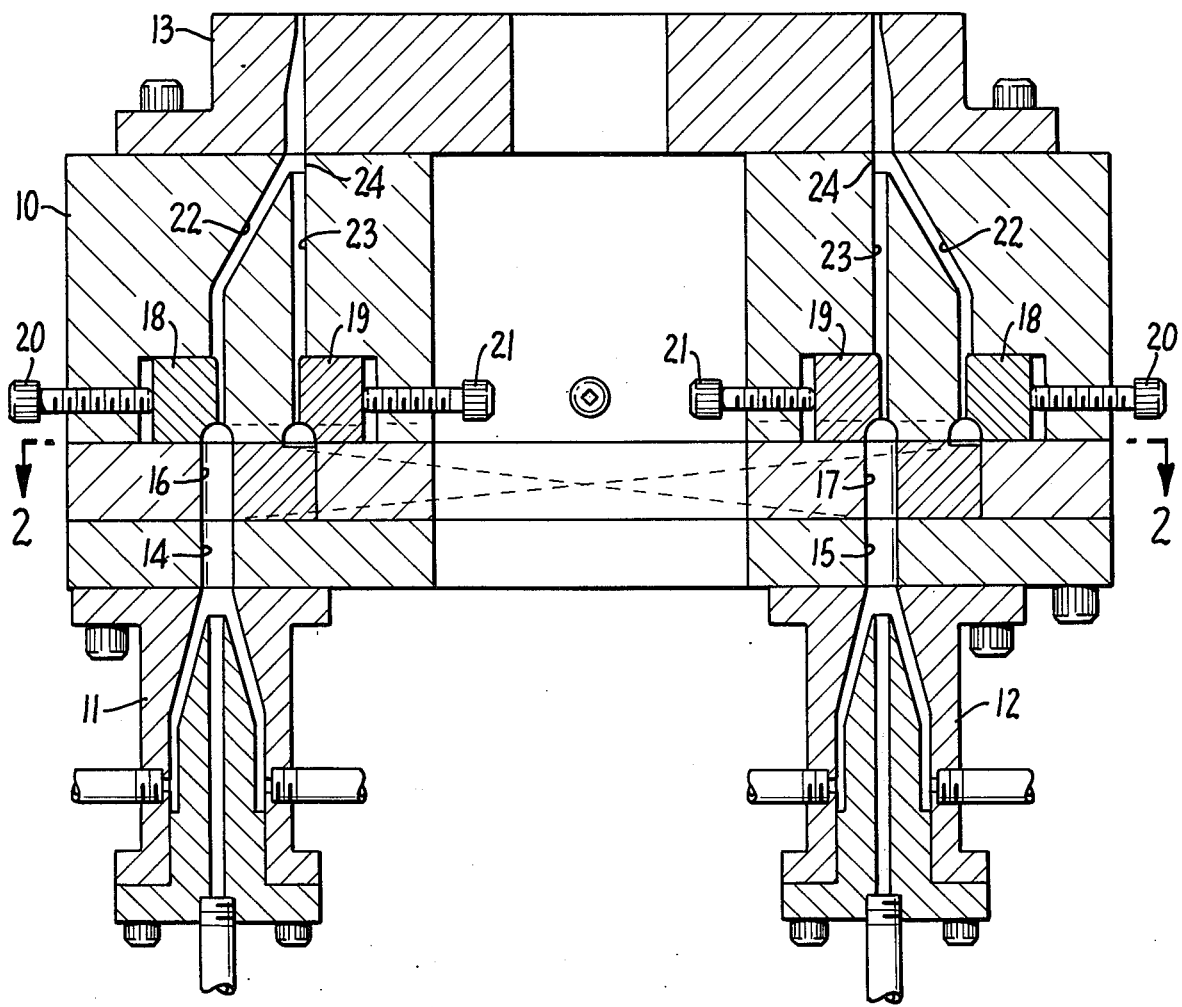
FIG. 1 is a sectional side view of the die body of this invention shown in association with combining adapters and a die head.

Referring to the drawings, the die body 10 of this invention is connected to a pair of combining adapters 11, 12 and a die head 13. The adapters 11, 12 and die head 13 are conventional.

Each of the adapters 11, 12 receives two or more streams of resin from extruders (not shown) and combines them into a composite stream having an essentially rectanular cross section. The composite stream formed in adapter 11 flows into a first inlet passageway 14 in the die body 10; and the composite stream formed in the other adapter 12 flows into a second inlet passageway 15 in the die body 10.

The first inlet passageway 14 communicates with an outer annular chamber 16; and the second inlet passageway 15 is in communication with an inner annular chamber 17. The annular chambers 16, 17 are substantially concentric.

When the composite stream flowing from the first inlet passageway 14 enters the outer annular chamber 16, it divides into two substreams which flow laterally in opposite directions in the annular chamber 16, whereby the cross section of the stream changes from rectangular to annular. Similarly, when the composite stream flowing from the second inlet passageway 15 enters the inner annular chamber 17, it also divides into two substreams which flow laterally in opposite directions in the annular chamber 17.

The inlet passageways 14, 15 are preferably offset so that the weld formed by the resin stream in the outer annular chamber 16 is offset from, rather than superimposed on, the weld formed by the resin stream in the inner annular chamber 17. Being offset, the welds are laminated over, resulting in a stronger tubular film. In the embodiment shown in the drawings, the inlet passageways 14, 15 are offset 180°.

Figure 2:
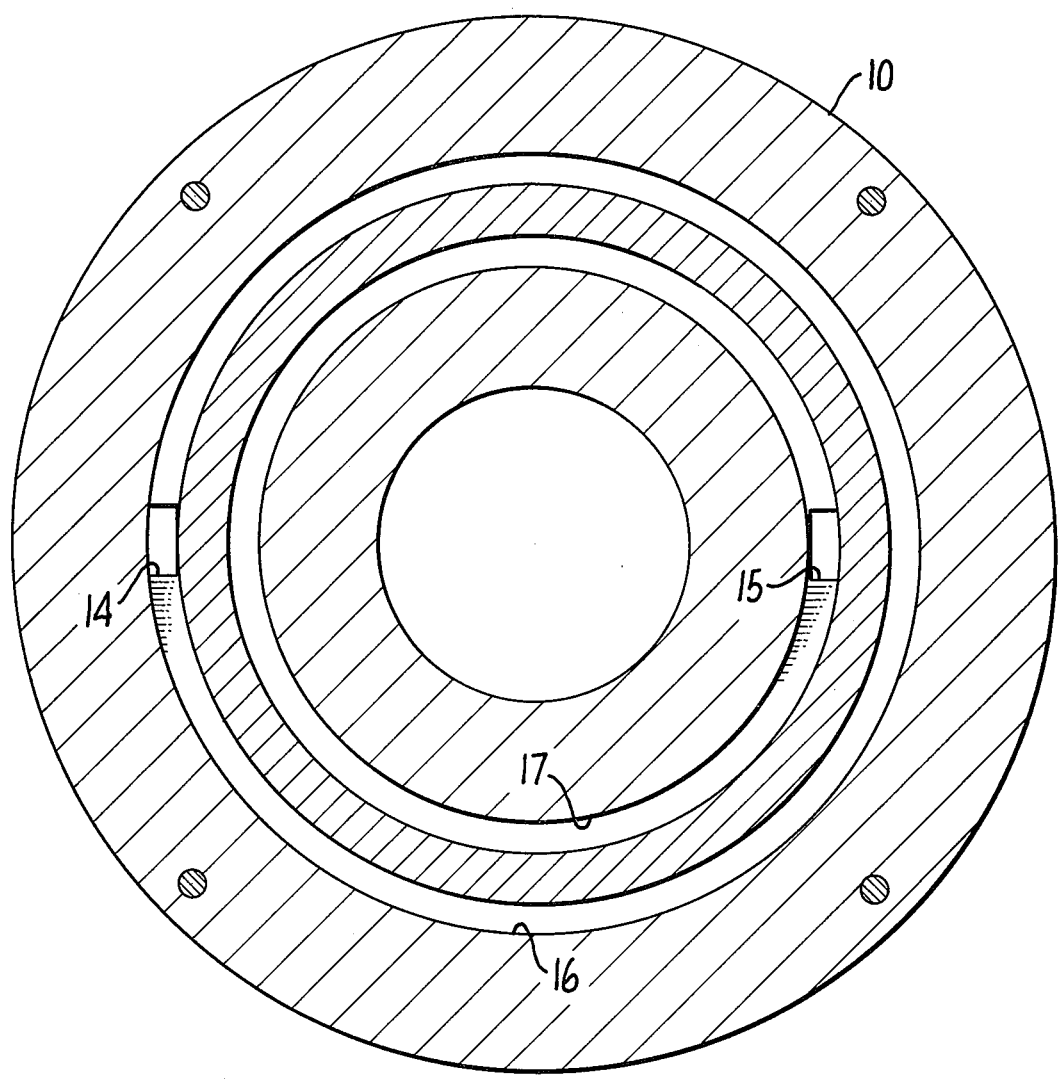
FIG. 2 is a sectional top view of the die body taken in a plane indicated by line 2—2 in FIG. 1.
Figure 3:
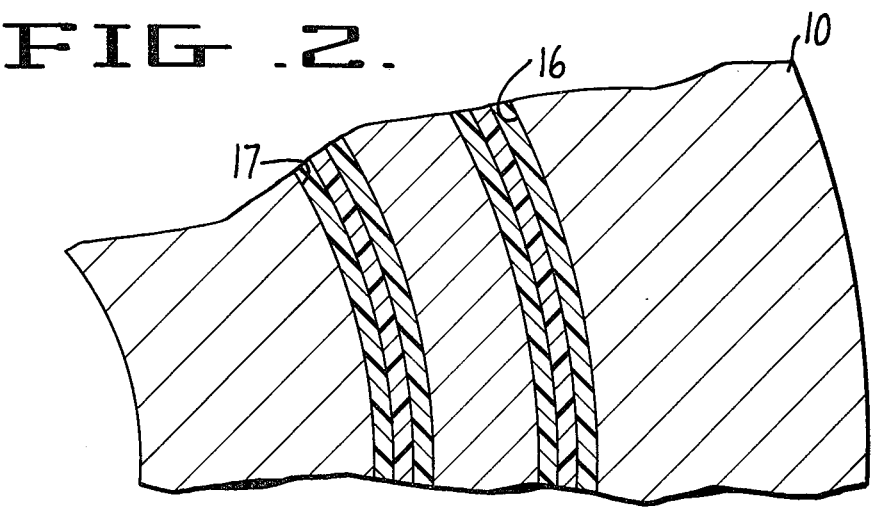
FIG. 3 is a fragmentary portion of FIG. 2 illustrating the streams as they appear in the annular chambers during continuous operation.

For clarity of illustration, the resin streams are not shown in FIGS. 1 and 2. In actual operation, the streams would flow continuously and completely fill the chambers, as shown in FIG. 3.

Each of the annular chambers 16, 17 has a generally rectangular vertical cross section; and the width of each cross section is substantially constant, so when the substreams flow laterally in the annular chambers 16, 17, they do so without being compressed in a direction perpendicular to the plane of the resin layers. As a result, the thicknesses of the layers remain substantially constant.

In a preferred embodiment, the bottom of each annular chamber is inclined from the inlet passageway. As a result, the height of each annular chamber is reduced in a direction away from the inlet passageway, as shown in FIG. 1. This tapered configuration of the annular space prevents stagnation of the resin substream at the end of each annular chamber away from the inlet passageway. Although FIG. 1 is a sectional view, the top and bottom of each chamber is indicated by dashed lines to illustrate the inclination of the bottom of each chamber.

An outer adjustable choke ring 18 regulates the flow of the annular stream from the outer annular chamber 16; and an inner adjustable choke ring 19 regulates the flow of the annular stream from the inner annular chamber 17. The outer choke ring 18 is adjusted by means of setscrews 20; and the inner choke ring 19 is adjusted by means of setscrews 21.

The resin streams flow from the annular chambers 16, 17 through outlet passageways 22, 23 which converge to form a single common annular discharge passageway 24 from which a composite of the two streams is fed into the die head 13. The composite stream is expressed from the die head 13 as a tubular multilaminate film.

Compared to the die disclosed in West German OLS 2,430,231, the die of this invention has the following advantages in producing films having the same number of layers: (1) simpler adapters are required since two rather than one are used to combine the same number of resin streams; (2) better welding of the substreams is achieved because the streams are thinner and have fewer layers, and because two welds, which are offset and laminated over, are formed instead of one; and (3) resins having a greater difference in viscosity can be used (e.g. two low viscosity resins can be combined in one adapter and two high viscosity resins can be combined in the other adapter).

Although this invention has been described with particular reference to producing multilaminate films by combining two or more resins in each adapter, it will be appreciated that the die of the invention can be used in situations where only a single resin is passed through one of the adapters. For example, if it is desired to produce a tetralaminate film in which one of the resins has a viscosity which is substantially different from the other three resins, it may be more desirable to combine three resin streams in one adapter and pass the fourth stream through the other adapter rather than combine two resin streams in each adapter. Of course, the adapter carrying only one resin stream can be replaced with a direct feed pipe.

The invention is particularly suitable for producing films having four, five or six layers.

I claim:

1. A method of producing a tubular plastic film having four or more resin layers comprising a. combining at least two resin streams into a first stream of parallel layers of the resins and continuously feeding said first stream into a first annular space without compressing the stream in a direction perpendicular to the plane of the layers such that the first stream divides into two substreams which flow in opposite directions about the axis of the annular space and then join to form a first annular stream in which the layers are coaxial, the height of each substream being reduced as it flows through the annular space, b. combining the other resin streams into a second stream of parallel layers of the resins and continuously feeding the second stream into a second annular space substantially concentric with the first annular space without compressing the stream in a direction perpendicular to the plane of the layers such that the stream divides into two substreams which flow in opposite directions about the axis of the second annular space and then join to form a second annular stream in which the layers are coaxial, the height of each substream being reduced as it flows through the annular space, the second stream of parallel layers being fed into the second annular space at a location offset from the location at which the first stream of parallel layers is fed into the first annular space, c. regulating the flow of the first annular stream from the first annular space and, independently, regulating the flow of the second annular stream from the second annular space, d. combining the first and second annular streams into a composite annular stream, and e. expressing the composite stream through an annular orifice to form the tubular film.

* * * * *